(12) United States Patent
Simonsen

(10) Patent No.: US 12,152,693 B2
(45) Date of Patent: Nov. 26, 2024

(54) METHOD FOR OPERATING A VALVE AND AN OPERATING KEY SYSTEM

(71) Applicant: AVK HOLDING A/S, Galten (DK)

(72) Inventor: Christian Henrik Simonsen, Ulstrup (DK)

(73) Assignee: AVK HOLDING A/S, Galten (DK)

( * ) Notice: Subject to any disclaimer, the term of this patent is extended or adjusted under 35 U.S.C. 154(b) by 0 days.

(21) Appl. No.: 18/034,196

(22) PCT Filed: Nov. 17, 2020

(86) PCT No.: PCT/DK2020/050312
§ 371 (c)(1),
(2) Date: Apr. 27, 2023

(87) PCT Pub. No.: WO2022/105971
PCT Pub. Date: May 27, 2022

(65) Prior Publication Data
US 2023/0392713 A1      Dec. 7, 2023

(51) Int. Cl.
*F16K 37/00*      (2006.01)
*F16K 31/46*      (2006.01)
*F16K 31/60*      (2006.01)

(52) U.S. Cl.
CPC .......... *F16K 37/0083* (2013.01); *F16K 31/46* (2013.01); *F16K 31/602* (2013.01)

(58) Field of Classification Search
CPC ............. F16K 37/0033; F16K 37/0041; F16K 37/0083; F16K 31/508
See application file for complete search history.

(56) References Cited

FOREIGN PATENT DOCUMENTS

| EP | 3978693 A1 * | 4/2022 | .............. E03B 7/00 |
| FR | 2668239 A1 * | 4/1992 | ......... F16K 37/0041 |
| GB | 2277185 A | 10/1994 | |
| JP | H10299941 A | 11/1998 | |
| KR | 20000024395 A * | 5/2000 | |
| KR | 101999777 B1 | 7/2019 | |
| WO | 9613639 A1 | 5/1996 | |
| WO | WO-03100950 A1 * | 12/2003 | .............. F01P 7/167 |

(Continued)

OTHER PUBLICATIONS

Machine English translation of KR101999777 (Year: 2024).*

(Continued)

*Primary Examiner* — Hailey K. Do
(74) *Attorney, Agent, or Firm* — CANTOR COLBURN LLP

(57) ABSTRACT

A method for operating a valve including locating an operating key system at the valve, communicating a location of the operating key system wirelessly to a central data system, communicating a rotational direction to open or close the valve wirelessly, engaging operating means of the valve by means of an operating key of the operating key system, rotating the operating key manually towards an open or a closed position of the valve while engaging the operating means, detecting the direction in which the operating key is rotated, detecting if the valve has reached the open or closed position, and communicating the location, the direction of rotation and the open or closed position wirelessly to a central data system.

20 Claims, 3 Drawing Sheets

(56) References Cited

FOREIGN PATENT DOCUMENTS

WO    2020000018 A1    1/2020

OTHER PUBLICATIONS

Figure 1:
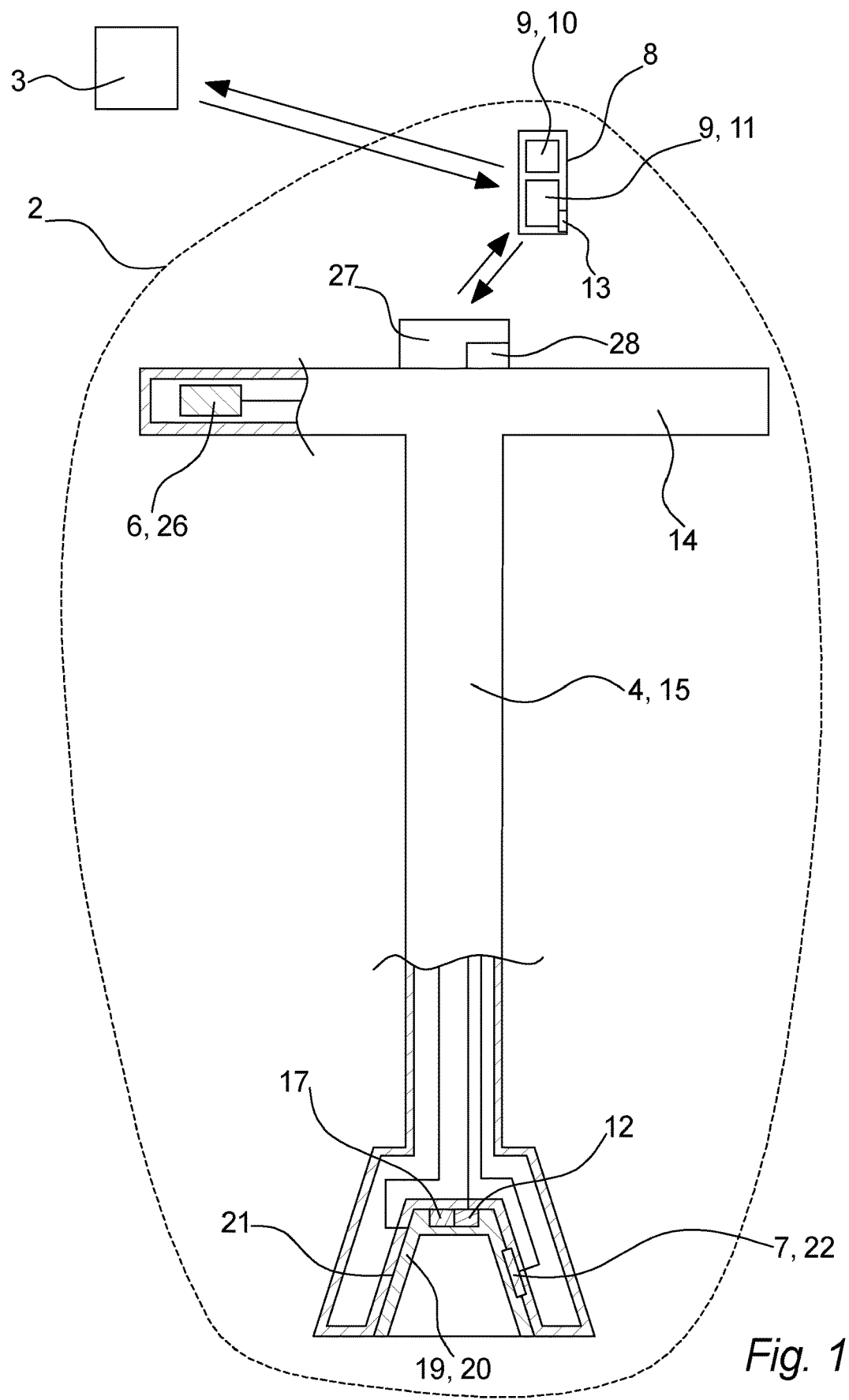

Machine English translation of JPH10299941 (Year: 2024).*
Machine English translation of EP3978693 (Year: 2024).*
Machine English translation of FR2668239 (Year: 2024).*
Machine English translation of WO03100950 (Year: 2024).*
Machine English translation of KR20000024395 (Year: 2024).*
International Preliminary Report on Patentability for corresponding application PCT/DK2020/050312 filed Nov. 17, 2020; Mail date Oct. 24, 2022.
International Search Report for corresponding application PCT/DK2020/050312 filed Nov. 17, 2020; Mail date Sep. 7, 2021.
Written Opinion for corresponding application PCT/DK2020/050312 filed Nov. 17, 2020; Mail date Sep. 7, 2021.

* cited by examiner

METHOD FOR OPERATING A VALVE AND AN OPERATING KEY SYSTEM

FIELD OF THE INVENTION

The invention relates to method for operating a valve, an operating key system for operating a valve and use of the method.

BACKGROUND OF THE INVENTION

Valves in e.g. a water or gas distributing system are typically buried in the ground and operated manually from the ground surface and it is typically not possible to detect the current open/close status of the individual valves in the distributing system. And since the valves in the distributing system can be in operation for up to years or even more it can be very difficult to keep track of the open/close status of the entire distributing system.

From UK patent application GB 2 277 185 A a fluid distribution system is therefore known in which a valve key comprises a read head for reading identification means in the cap of the valve. The valve key is further provided with means for detecting the rotational direction in which the valve key is turned while engaging the valve. Information regarding the rotational status can the subsequently be transmitted to a central data logging station. However, this system requires that the valves are adapted to communicate they identity to the valve key which is complex and costly to enable. Furthermore, this system requires being operated by a highly skilled operator.

An object of the invention is therefore to provide for an advantageous technique for operating a valve alleviating the abovementioned drawbacks.

The Invention

The invention provides a method for operating a valve. The method comprises the steps of:
  locating an operating key system at the valve,
  communicating a location of the operating key system wirelessly to a central data system from the operating key system,
  communicating a rotational direction to open or close the valve wirelessly from the central data system to the operating key system based on the location,
  engaging operating means of the valve by means of an operating key of the operating key system,
  rotating the operating key manually towards an open or a closed position of the valve while engaging the operating means based on the received rotational direction to open or close the valve,
  detecting the direction in which the operating key is rotated, wherein the direction of rotation is detected by means of rotation direction detection means of the operating key,
  detecting if the valve has reached the open or closed position, wherein the open or closed position is detected by means of end position detection means of the operating key, and
  communicating the location, the direction of rotation and the open or closed position wirelessly to the central data system from the operating key system.

Some valves have to be rotated in one direction to reach the closed position and some valves have to be rotated in the opposite direction to reach the closed position. Thus, it is advantageous to know the rotational direction to open or close a specific valve at a specific location before operating the valve. And by detecting the actual direction of rotation while the valve is being operated it is possible to communicate to a central data system that the valve has actually been rotated in the right direction to reach the desired position. And by detecting if the valve has reached the open or closed position by means of end position detection means of the operating key it is possible to log if the valve actually has reached the desired end position (i.e. the correct end position). Thus, by communicating the location, the direction of rotation and the open or closed position wirelessly to a central data system it is thereby possible to establish a reliable log of the current open/close status of all the valves being operated by means of this method—also even if the operator turns the valve in the wrong direction, in that the valve then will be logged as positioned in that state (i.e. the wrong state) and the mistake can be corrected. In this way the method may be performed by an unskilled operator while still ensuring that reliable date regarding the valve status is stored.

An operator has to be present to locate the operating key system at the valve, to ensure that the operating key engages the operating means of the valve etc. and it is therefore advantageous to make the operator manually rotate the operating key in that this ensures a more simple and inexpensive method.

Furthermore, e.g. in a water distributing system a large number of valves are scattered over a large area and it is therefore advantageous to communicate the rotational direction to open or close the valve wirelessly from the central data system and to communicate the location, the direction of rotation and the open or closed position wirelessly to the central data system in that this enables that all data can be stored and accessed a single place which provides an overview over all the valves being operated by the present method. I.e. in this way the central data system may collect status data from many valves installed at different locations.

It should be noted that in this context the term "operating means" includes any kind of operating device or operator of a valve by means of which a blocking element inside the valve can be displaced between an open and a closed position and vice versa when rotating the operating means. I.e. in this embodiment the term covers any kind of peg, pin, stud, handle, gear, wheel or other directly or indirectly connected to the mechanism inside the valve ensuring that the blocking element is displaced when the operating means is rotated. I.e. the term "operating means" also comprises extension spindles or rods connected to e.g. a buried valve at one end and extending to the ground surface at which it can be engaged by the operating key.

It should also be noted that in this context the term "rotation direction detection means" includes any kind of rotation direction detector capable of detecting the direction in which the operating key is rotated. I.e. the term includes any kind of accelerometer arrangement, rotary encoder system, potentiometer system, tachometer, magnets detected by sensors or other or any combination thereof.

Furthermore, it should be noted that in this context the term "end position detection means" includes any kind of end position detector capable of directly or indirectly determining when the end position of the blocking element inside the valve being operated by the operating key system has been reached—i.e. a fully open or fully closed position. I.e. the term includes any kind torque sensor, strain gauge arrangement, rotational angle detector detecting the full rotation angle, any kind of processor capable of determining the position based on input from the these or from other sensors—such as flow detection sensors—, from stored information in a memory or other or any combination thereof and the term includes any kind of sensors capable of detecting the position directly or indirectly. However, it should be noted that the "end position detection means" in an embodiment could also be configured to detect any position of the valve—i.e. also positions between the two end positions (fully open and fully closed).

Even further, it should be noted that in this context the term "central data system" includes any kind of central data headquarter capable of wireless communication with the operating key system and capable of storing received data and transmitting stored data. I.e. the term refers to any kind of central server solution, cloud solution, central computer or other comprising a data transmitter and a data receiver capable of communicating by means of a wireless communication protocol such as WIFI, Sigfox, LoRa, Bluetooth, Zigbee or other.

In an aspect, detecting if the valve has reached the open or closed position includes detecting the torque applied by the operating key on the operating means while rotating the operating key.

Between the fully closed position and the fully open position the torque required to rotate the operation means is relatively small. However, when an end position is reached the torque increases dramatically. Thus, detecting the torque applied by the operating key on the operating means while rotating the operating key provides reliable information regarding if an end position has been reached in a simple and inexpensive manner.

In an aspect, detecting if the valve has reached the open or closed position includes detecting the rotational angle of the operating key.

The rotational angle between fully open and fully closed—i.e. the number of rotations needed to move the blocking element of the valve from one extreme position to the other extreme position—in know if the valve type is known. Thus, detecting the rotational angle of the operating key enables that detecting if the valve has reached the open or closed position can be done in a simple and inexpensive manner.

It should be noted that in this context the term "detecting the rotational angle of the operating key" includes that not only is the angular position at least to some degree detected but also that this done so that the number of rotations of the operating key is also detected. I.e. the term is not limited to only detecting angles between 0 and 360 degrees but includes continuous accumulated detection of angles between e.g. 0 and 2,000 degrees or another range depending on the number of rotations needed to move the blocking element of the valve between a fully closed or a fully open position or vice versa. And by continuously is not necessarily meant that all angular positions are detected accurately. The term also includes determining the rotation angle in increments e.g. with a resolution of 10 degrees, 45 degrees, 90 degrees, 180 degrees or even 360 degrees so that only every full rotation is detected.

In an aspect, the method comprises communicating the location, the direction of rotation and the open or closed position wirelessly to the central data system via a control unit of the operating key system.

Wireless communication requires dedicated power consuming equipment and by doing this by means of a control unit enables a larger degree of freedom in designing and operating the operating key system.

It should be noted that in this context the term "control unit" includes any kind of unit capable of communicating wirelessly to the central data system. I.e. the term includes any kind of communicating device formed more or less integrally with the operating key and/or any kind of unit separate from the operating key such as any kind of mobile phone, computer, tables or other or other or any combination thereof.

In an aspect, the operating key system comprises a control unit including a user interface.

Providing the control unit with a user interface is advantageous in that this enables that information received from the central data system can easily be presented to the operator and that the operator easily can communicated with the central data system.

In an aspect, the method comprises communicating the location, the direction of rotation and the open or closed position wirelessly to the central data system by means of the control unit.

Communicating with the central data system by means of the control unit is advantageous in that it hereby is possible to arrange the complex and power consuming communication equipment needed for this in a dedicated unit.

In an aspect, the method comprises communicating the location, the direction of rotation and the open or closed position wirelessly from the operating key to the control unit and wirelessly from the control unit to the central data system.

Communicating the location, the direction of rotation and the open or closed position wirelessly from the operating key to the control unit is advantageous in that the control unit hereby can be arranged physically independent from the operating key—hereby enabling that the wirelessly communication with the central data system can be done by more standardised and inexpensive long-range communication devices. Furthermore, the more delicate long-range communication device can be arranged separate from the operating key which is often manhandled and subject to more extreme conditions.

In an aspect, the location of the operating key system is detected by means of the control unit.

Detecting the location of the operating key system by means of the control unit is advantageous in that this enables that the location detection can be done by means of more standardised and inexpensive location detection means such as GPS, Wi-Fi triangulation, broadcast tower triangulation or other. Furthermore, the more delicate location detection equipment can be arranged separate from the operating key which is often manhandled and subject to more extreme conditions.

In an aspect, the location of the operating key system is communicated wirelessly to the central data system by means of the control unit.

Communicating the location of the operating key system wirelessly from the control unit to the central data system is advantageous in that this enables that the wirelessly communication with the central data system can be done by more standardised and inexpensive long-range communication devices.

In an aspect, the rotational direction to open or close the valve is communicated wirelessly from the central data system to the control unit and displayed by means of the user interface.

The operating key is a relatively large tool that is often manhandled and subject to extreme conditions and it is therefore advantageous to communicate information to the operator through the user interface. Furthermore, a user interface enables more complex information being communicated more simply and inexpensively.

In an aspect, the user interface comprises display means and input means.

Providing the user interface with both display means and input means is advantageous in that this enables the operator to both receive and input information the same place in a simple and inexpensive manner.

It should be noted that in this context the term "display means" includes any kind of display capable of presenting information in visual form. I.e. the term includes any kind of screen, segment display, LED arrangement or other or any combination thereof.

It should also be noted that in this context the term "input means" includes any kind of input device by means of which the operator can input data. I.e. the term includes any kind of keyboard, button arrangement, switch arrangement, microphone or other or other or any combination thereof.

In an aspect, the operating key and the control unit are formed as two physically separate parts.

Forming the operating key and the control unit as two physically separate parts is advantageous in that this enables that more delicate equipment in the control unit can be arranged separate from the operating key which is often manhandled and subject to more extreme conditions.

In an aspect, the control unit is at least partly integrated with the operating key.

Integrating the control unit with the operating key is advantageous in that this simplifies logistic and reduces cost in that wireless communication equipment for communicating wirelessly between the control unit and the operating key can be omitted.

In an aspect, the control unit is a mobile phone, a tablet, or a laptop.

A common feature of mobile phones, tablets, and laptops is that these are all relatively inexpensive standard of the shelf equipment comprising wireless communication means (both short and long range), location detection means, user interface etc. making it advantageous to use these as the control unit for an operating key system according to the present invention.

In an aspect, the operating key system is located at the valve manually by an operator of the operating key system.

The operation key of the operating key system is manually operated by the operator when the valve is opened or closed by the present method and since the operator have to be present for this it is cost efficient to make the operator manually locate the operating key system at the valve.

In an aspect, communication of the location of the operating key system wirelessly to a central data system is initiated by an operator of the operating key system.

Making the operator initiate the communication of the location of the operating key system wirelessly to a central data system is advantageous in that it hereby is ensured, that the correct location is communicated—i.e. the location is not communicated until the operating key system is actually placed at the valve to be operated.

In an aspect, the method further comprises the step of storing the location, the direction of rotation and the open or closed position at the central data system.

Storing the location, the direction of rotation and the open or closed position at the central data system is advantageous in that subsequently reliable data regarding the valve can be retrieved enabling better and more simple management of the fluid distribution system of which the valve form part.

In an aspect, the method further comprises detecting if the operating key is engaging the operating means correctly by means of engagement detection means of the operating key.

Providing the operating key with engagement detection means to detect if the operating key is engaging the operating means correctly is advantageous in that it hereby can be ensured that the operator does not start turning until the operating key is fully engaged whereby the reliability of the operating key system and the present method is increased.

It should be noted that in this context the term "engagement detection means" includes any kind of engagement detector capable of detecting if the operating key is engaging the operating means correctly. I.e. the term includes any kind of proximity senor, distance sensor, inductive sensor, camera or other or other or any combination thereof.

In an aspect, the method further comprises the step of obtaining the location of the operating key system by means of a GPS unit of the operating key system.

Providing the operating key system with a GPS unit (the satellite-based radionavigation system called Global Positioning System (GPS)) is advantageous in that the operating key system hereby is able to send exact location data to the central data system in a simple and inexpensive manner from anywhere on the globe.

In an aspect, the operating key is rotated manually by an operator engaging a handhold of the operating key.

Making the operator engage a handhold of the operating key when rotating it is advantageous in that this enables that the operator may operate the valve more precisely with greater torque.

In an aspect, the handhold is extending substantially radially from a central operating rod engaging the operating means of the valve.

Forming the operating key from a central operating rod from which a handhold is extending radially is advantageous in that this enables that the operator may operate the valve more precisely with grater torque.

In an aspect, the method comprises detecting identification means of the valve by means of identification detection means of the operating key system.

Detecting identification means of the valve by means of the operating key system is advantageous in that this can further increase the reliability of the system and method.

The term "identification means" is in this context to be understood as any kind identifier by means of which data regarding the valve can be identified. I.e. the term comprises any kind of label, RFID tag, EPROM (Erasable Programmable Read Only Memory) or any other kind of manual or electrical means capable of holding information regarding the specific valve type, operational data of the valve, the system in which the valve is in effect and/or other.

It should also be noted that in this context the term "identification detection means" includes any kind of identification detector capable of detecting identification means of the valve. I.e. the term includes any kind of RFID tag reader, EPROM reader, camera or other or any combination thereof.

In an aspect, identification data of the valve is also communicated wirelessly from the central data system to the operating key system based on the location.

Also communicating identification data of the valve to the operating key system based on the location of the operating key system—and thereby the valve—is advantageous in this will enable more safe and reliable operation of the valve when the operator knows the identification data of the current valve.

In an aspect, a maximum end position torque data of the valve is also communicated wirelessly from the central data system to the operating key system based on the location.

Also communicating the maximum end position torque data of the valve to the operating key system based on the location of the operating key system—and thereby the valve—is advantageous in that this can ensure that the operator does not apply more torque to the valve than it can handle without being damaged.

In an aspect, the valve is buried beneath ground surface.

Hereby is achieved an advantageous embodiment of the invention.

The invention also relates to an operating key system for operating a valve by means of a method according to any of the previously discussed methods.

By such an operating key system is achieved an advantageous embodiment of the invention.

The invention further relates to use of a method according to any of the previously discussed methods for operating a valve buried beneath ground surface.

Almost all valves in most water and gas distributing systems are buried beneath ground surface and are typically only accessible through an extension spindle extending from the valve to the ground surface. Thus, in relation to buried valves information regarding the valve cannot be obtained by inspecting the valve and use of the present method is therefore particularly advantageous in relation to buried valves.

FIGURES

Figure 2:
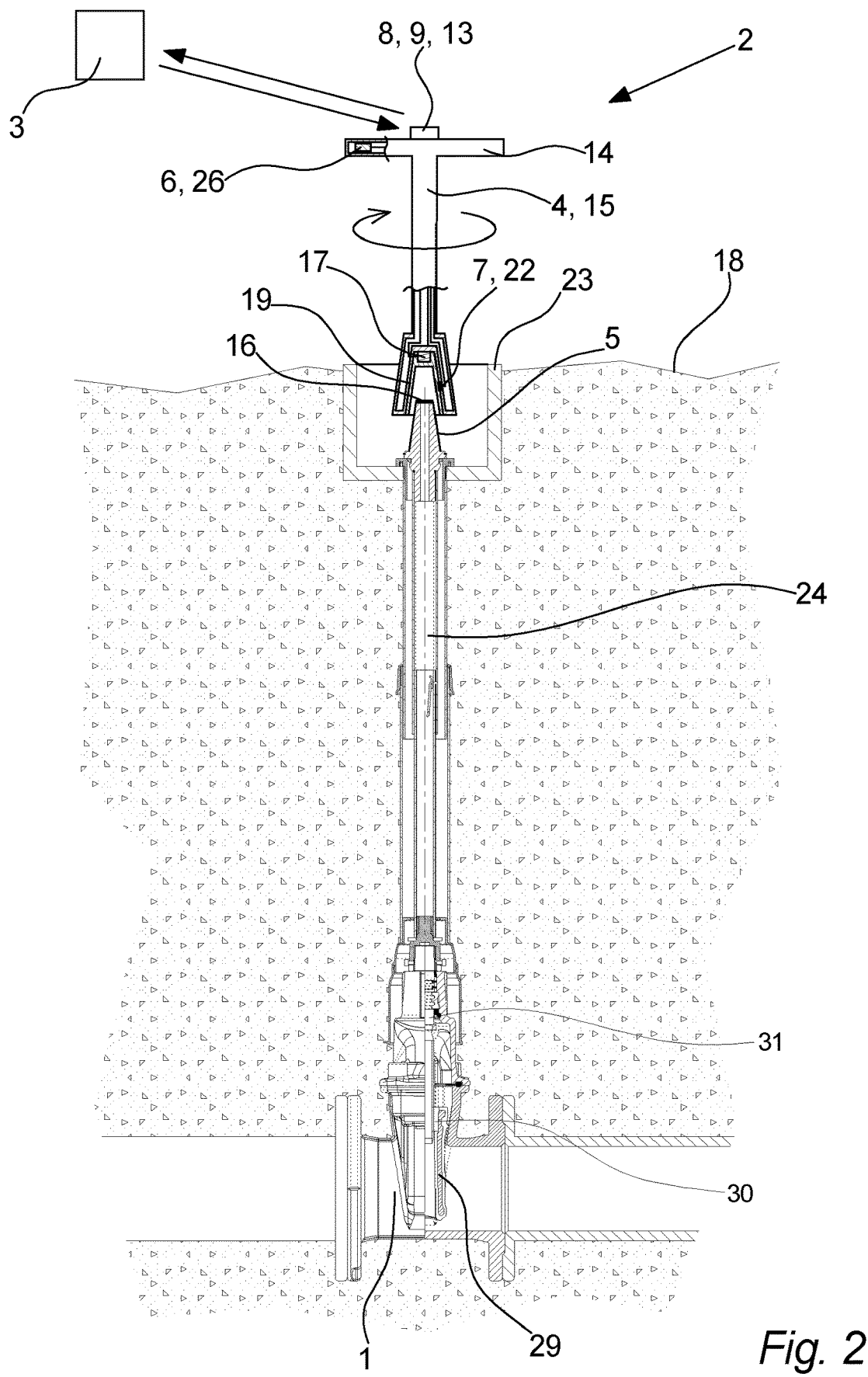
Figure 3:
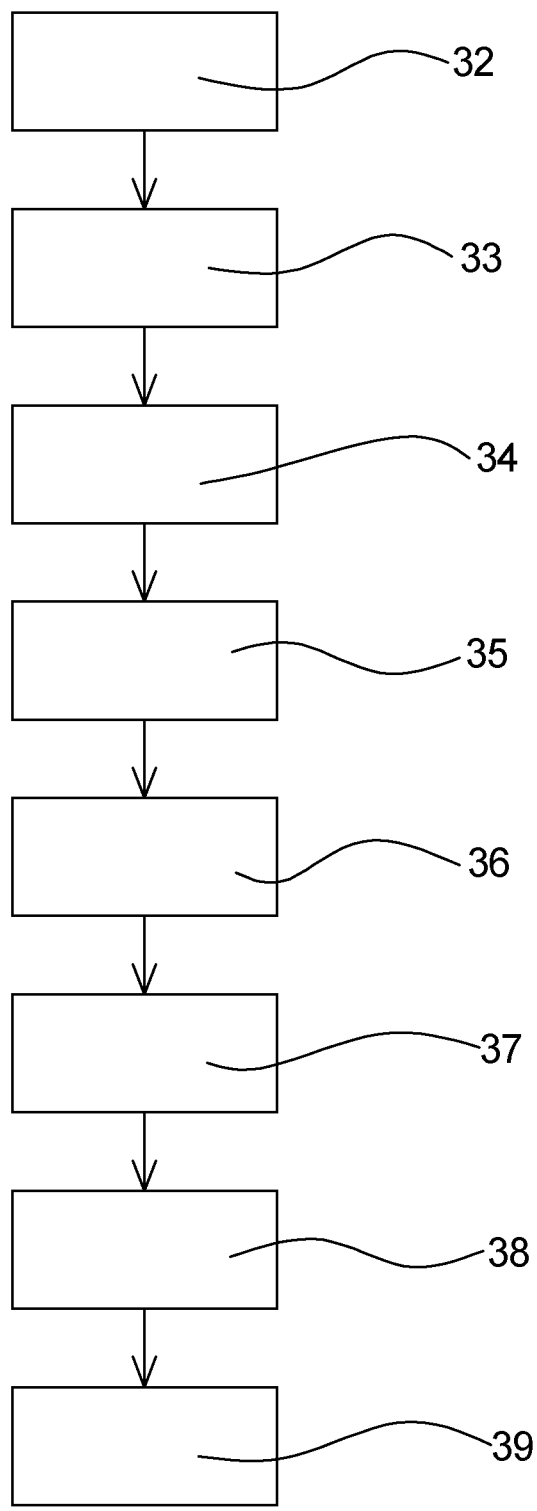

An embodiment of the invention will be described, by way of non-limiting example, in the following with reference to the figures in which:

FIG. 1 illustrates an operating key system with a partial cross section through the middle of an operating key, as seen from the side, FIG. 2 illustrates an operating key system operating a buried valve, as seen from the side, and FIG. 3 illustrates method steps of the current method.

DETAILED DESCRIPTION

FIG. 1 illustrates an operating key system 2 with a partial cross section through the middle of an operating key 4, as seen from the side.

In this embodiment the operating key 4 comprises a central operating rod 15 which at the bottom end comprises engagement means 19 for engaging operating means 5 of a valve 1 and in the upper end comprises a handhold 14 extending radially from the central operating rod 15. In this embodiment the handhold 14 is basically a transverse rod but in another embodiment the handhold 14 could also or instead be formed as a X, as a circle, as a polygon or other.

In this embodiment the engagement means 19 are formed as an inner cavity having an inner shape adapted to positively engage (i.e. geometrically interlock with) the operating means 5 of a valve 1.

It should be noted that in this context the term "engagement means" includes any kind of engager capable of engaging the operating means 5 of a valve 1. I.e. the term comprises any kind of interlocking shape, fixing arrangement, clamping arrangement or other or any combination thereof.

In this embodiment the operating key 4 comprises end position detection means 7. I.e. in this embodiment the engagement means 19 comprises an inner shell 20 capable of at least a little rotational movement in relation to a housing cavity 21 of the central operating rod 15. Between the inner shell 20 and the housing cavity 21 is arranged a strain gauge arrangement 22 by means of which it is possible to detect the torque applied by the operator by means of the operating key 4 on the operating means 5 of the valve 1 when the operating key 4 is rotated while engaging the operating means 5. I.e. in this way it is possible to detect if the valve 1 has reached an open or closed position in that the detected torque will rise dramatically when the valve 1 reaches an extreme position. In an embodiment the end position detection means 7 could also be arranged to function as rotation direction detection means 6 e.g. if the strain gauge arrangement 22 was arranged to not only detect the applied torque by also was able to detect the rotational direction of the torque or e.g. if a magnet was arranged on the inner shell 20 and two inductive sensors was arranged slightly displaced is each of the two rotational directions, then the rotational direction could be detected from which sensor was activated when torque is applied by the operator.

However, in this embodiment the rotation direction detection means 6 are enabled by means of an accelerometer 26 arranged at the outer end of the handhold 14 but in another embodiment the accelerometer 26 could be arranged elsewhere on the operation key.

In another embodiment end position detection means 7 could comprise means to detect the rotational angle of the operating key e.g. by counting the number revolutions made by the operating key 4 when operating the valve 1. The number of revolutions needed to move the valve 1 from a fully open position to a fully closed position or vice versa is known when the valve type is known and if it is known that a valve 1 is e.g. in a fully closed position, the fully open position can be detected simply by counting the number of rotations made by the operating key 4 while engaging the operating means 5 of the valve 1 i.e. by detecting the accumulated rotational angle. This could e.g. be done by arranging a fixed detection object on the ground next to the operating means 5 or on the operator and then provided the operating key with a sensor detecting and counting the number of times the detection object is passed. This will obviously give a rotational angle with a resolution of 360° so if a grater resolution were needed more evenly spaced fixed detection objects could be added or the rotational angle could be detected by means of e.g. cameras and picture analysis, rotational encoders or other.

In this embodiment the operating key 4 is further provided with engagement detection means 12 in the form of a proximity sensor arranged at the engagement means 19 so that the proximity sensor will detect when the engagement means 19 is engaged with the operating means 5 of the valve 1. However, in another embodiment the engagement detection means 12 could be formed as a switch on the engagement means 19 being activated by the operating means 5 or in numerous other ways.

In this embodiment the operating key 4 is further provided with identification detection means 17 in the form of a RFID tag reader arranged to read the information of an RFID tag placed on the operating means 5 of the valve 1 and containing e.g. information regarding the valve type, the distributing system in which it is installed, a unique identification code, location or other.

In this embodiment all the information detected by the rotation direction detection means 6, the end position detection means 7, the engagement detection means 12 and the identification detection means 17 is transferred by cable to a communication device 27 arranged on the operating key 4 from which the information is transmitted wirelessly to a control unit 8 arranged separate from the operating key 4. In this embodiment the control unit 8 is the operator's mobile phone on which a dedicated application is installed. From the control unit 8 the information is transmitted wirelessly to a central data system 3 which in this case is a cloud-based database in which the information is stored and e.g. processed and from which the information may be retrieved e.g. by operators of the local distribution company. In another embodiment the central data system 3 could e.g. be a server or a cloud-solution operated by at the local distribution company, by a national or local authority, by the valve manufacture company and/or others. In another embodiment the control unit 8 could also or instead be a dedicated device, a tablet, a laptop or other.

In this embodiment the control unit 8 comprises a user interface 9 which in this case includes input means 11 in the form of a keyboard by means of which the operator may initiate that a location is transmitted to the central data system 3 when the operating key system 2 is located by the operator at the valve to be operated. By means of the interface 9 the operator could also enter further information to be transferred to the central data system 3—such as error reports, information regarding maintenance, state of valve or other.

In another embodiment the user interface 9 could also or instead comprise a microphone and voice recognition, a loudspeaker, a camera and picture analysing tools, dedicated buttons, tactile communication means or other or any combination thereof.

In response to the transmitted location a rotational direction to open or close the valve 1 at the location is transmitted to the operating key system 2 from the central data system 3 and displayed on display means 10 of the control unit 8. In this embodiment the display means 10 is the screen of the mobile phone but in another embodiment the display means 10 could also or instead comprise a light flashing green for rotating right to close the present valve 1 and red for rotating left to close the present valve 1, visual symbols lighting up or being raised from a surface or other or any combination thereof.

In this embodiment the operating key 4 and the control unit 8 together forms an operating key system 2. I.e. in this embodiment the operating key 4 and the control unit 8 both have to be present at the valve 1 being operated, during the operation of the valve 1. I.e. typically the operating key 4 and the control unit 8 will communicate by means of Bluetooth technology, Near Field Communication technology or another short-range communication protocol and the control unit 8 will communicate with the central data system 3 by means of the 5G, 4G, 3G or another mobile phone communication protocol or by means of Wi-Fi, Sigfox or another long-rang communication protocol.

In this embodiment the control unit 8 comprises a location detector in the form of a GPS unit 13 by means of the location of the operating key system 2 can be detected. However, in another embodiment the location detector could also or instead comprise Wi-Fi triangulation means, other triangulation means or other.

In this embodiment the operating key 4 is also provided with a power unit 28 arranged to provide electrical power to the communication device 27, the rotation direction detection means 6, the end position detection means 7, the engagement detection means 12, the identification detection means 17 and/or other power consuming devices in, on or at the operating key 4.

It should be noted that in this context the term "power unit" includes any kind of power generator capable of generating and/or supplying electrical power. I.e. the term comprises any kind of battery, fuel cell, solar cell, generator driven by an internal combustion engine or other or any combination thereof.

FIG. 2 illustrates an operating key system 2 operating a buried valve 1, as seen from the side.

In this embodiment the valve 1 is a gate valve comprising a blocking element 29 in the form of a vertically displaceable wedge comprising a wedge nut 30. The valve 1 also comprises operating means 5 located at the upper end of a substantially centrally arranged spindle 31, wherein the other end of the spindle 31 engages the wedge nut through a helical spline thereby enabling that when the operating means 5 is mechanical manipulated—i.e. rotated—, the spindle 31 will rotate and vertically displace the nut 30 and thereby the blocking element 29 to raise or lower it and thereby open or close the valve 1 to control the flow of a fluid through the valve 1.

However, in another embodiment the valve 1 could be another type of multi-turn valve where the spindle 31 and the operating means 5 will have to rotated more than one full rotation to move the blocking element 1 from an open position to a closed position—such as any kind of globe valve, fixed cone valve, needle valve, pinch valve or another type of valve 1 suited for controlling a flow of fluid through a pipe to which the valve 1 is connected—i.e. in another embodiment the blocking element 29 could comprise a plug, a disc, a needle, a hatch, a flexible sleeve, a pinching device or other. Or in another embodiment the valve 1 could in principle be a quarter-turn valve—i.e. a valve that only needs to be turned ninety degrees between fully open and fully closed positions, such as any kind of butterfly valves, ball valves, plug valve or other.

In this embodiment the valve 1 is buried below the ground surface 18 so in this embodiment the operating means 5 of the valve 1 comprises an extension device 24 connected to the valve 1 at the bottom end and extending up into a surface box 23 at which the elongated operating means 5 may be engaged by the operating key 4.

However, in another embodiment the operating means 5 could also or instead comprise a lever, a handle, a wheel or other and/or the operating means 5 could comprise another external shape and/or an internal shape suited for being engaged by the operating key 4 so that the valve 1 may be manipulated in order to actuate the blocking element 29 in the valve 1.

Also, in another embodiment the valve 1 could be accessed directly by mean of a longer operating key 4 or the valve 1 would be buried closer to the ground surface 18 or even at or above ground surface 18.

In this embodiment the control unit 8 is integrated with the operating key 4 to form the operating key system 2. I.e. in this embodiment the operating key 4 is capable of receiving rotational direction to open or close the valve 1 directly from the central data system 3 by means of the build-in control unit 8 and likewise capable of transmitting the information detected by the rotation direction detection means 6, the end position detection means 7, the engagement detection means 12, the identification detection means 17 and or other sensors in, on or at the operating key 4 to the central data system 3 by means of the build-in control unit 8. I.e. in this embodiment all the information detected regarding location and detected by the rotation direction detection means 6, the end position detection means 7 and e.g. the engagement detection means 12 and the identification detection means 17 is transferred wirelessly to the central data system 3 from the control unit 8 forming part of the operating key 4.

FIG. 3 illustrates the method steps of the method according to the present invention.

In a first step 32 the operator moves the operating key system 2 to the valve 1 to be operated so that the operating key system 2 is physically located at the valve 1—e.g. approximately immediately above a buried valve 1. In an embodiment the exact location of this valve 1 is known in advance and the location of the valve 1 to be operated could be communicated to the operator e.g. via the control unit 8. If the exact location of the valve 1 is not known the operator will identify the location from the surface box, on the basis of other known valves location, by tracking the pipes or other.

Once the operating key system 2 is located at the valve 1 the location of the operating key system 2 is communicated wirelessly to the central data system 3 by means of the operating key system 2 in a second step 33. The transmission of the location could e.g. be initiated by the operator by entering a command into the control unit 8.

In a third step 34 a rotational direction to open or close the valve 1 at the present location is communicated wirelessly from the central data system 3 to the operating key system 2 based on the location transmitted in the second step 33. If the location of this valve 1 is known in advance, the rotational direction to open or close the valve 1 at that location is typically also know in a database or similar of the central data system 3. However, if the exact location is not already known by the central data system 3 the information regarding the rotational direction to open or close the valve 1 will have to be retrieved from a database, from records, from trained personnel or other before it can be communicated to the operating key system 2.

Before, while or after communicating the location of the operating key system 2 to the central data system 3 the operator will in a fourth step 35 engage operating means of the valve 1 by means of the operating key 4 of the operating key system 2. If the operating key 4 comprises engagement detection means 12 the operator will in an embodiment not move on to the following method step (step 36) until the engagement detection means 12 has detected that the operating key 4 is engaging the operating means 5 correctly—i.e. the operating means 12 is engaged so that they will turn when the operating key 4 is turned. Correct engagement detected by the engagement detection means 12 could in an embodiment be communicated to the operator by means of the control unit 8 and/or the information could be communicated to the central data system 3 along with the other data at the end of the method in the eight step 39.

If the operating key 4 comprises identification detection means 17 these could in an embodiment detect identification means 16 of the valve 1 once the operating key 4 is engaging the operating means 5 correctly. The data read from the identification means 16 could in an embodiment be presented to the operator by means of the control unit 8 and/or the information could be communicated to the central data system 3 immediately when they are available and/or communicated along with the other data at the end of the method in the eight step 39.

Once the operating key 4 engages the operating means 5 of the valve 1 the operator will in a fifth step 36 manually rotate the operating key 4 towards an open position of the valve 1 if this is desired or towards a closed position of the valve 1 if this is desired while still ensuring that the operating key 4 is engaging the operating means 5. If it is desired to close the valve 1 the operator will turn the operating key 4 manually in the closing direction based on the rotational direction to open or close the valve 1 received in step 34 and likewise towards the open position it is desired to open the valve 1.

While the operator is manually rotating the operating key 4 to open or close the valve 1, rotation direction detection means 6 of the operating key 4 will in a sixth step 37 detect the direction in which the operating key 4 is rotated. The information detected by the rotation direction detection means 6 could in an embodiment be presented to the operator e.g. by means of the control unit 8 to further guide the operator.

And while the operator is manually rotating the operating key 4 to open or close the valve 1, end position detection means 7 of the operating key 4 will in a seventh step 38 detect if the valve 1 has reached the open or closed position. The operator will typically feel when an extreme position has been reached but in an embodiment the data from the end position detection means 7 could be presented to the operator by means of the control unit 8.

Once the desired open or closed position of the valve has been reached the location of the operating key system 2 (the location also communicated in the second step 33 or a newly detected location), the direction of rotation detected in the sixth step 37 and the open or closed position detected in the seventh step 38 will in an eight step 39 be communicated wirelessly to the central data system 3 from the operating key system 2. The communication of these data could be initiated automatically when the end position detection means 7 detects that an open or closed position has been reached or it could be initiated by the operator by means on an input provided manually to the control unit 8 or in another way.

In an embodiment data obtained from the engagement detection means 12, the identification detection means 17 and/or other sensors could also be communicated to the central data system 3 at this point along with the other data.

In the central data system 3 these data will in an embodiment now be stored so that reliable date regarding the current valve 1 can be retrieved at any time in the future.

The invention has been exemplified above with reference to specific examples of valves 2, operating keys 4, control units 8 and other. However, it should be understood that the invention is not limited to the particular examples described above but may be designed and altered in a multitude of varieties within the scope of the invention as specified in the claims.

LIST

1. Valve
2. Operating key system
3. Central data system
4. Operating key
5. Operating means
6. Rotation direction detection means
7. End position detection means
8. Control unit
9. User interface
10. Display means
11. Input means
12. Engagement detection means
13. GPS unit
14. Handhold
15. Central operating rod
16. Identification means
17. Identification detection means
18. Ground surface 19. Engagement means
20. Inner shell
21. Housing cavity
22. Strain gauge arrangement
23. Surface box
24. Extension device
25.
26. Accelerometer
27. Communication device
28. Power unit
29. Blocking element
30. Wedge nut
31. Spindle
32. First method step
33. Second method step
34. Third method step
35. Fourth method step
36. Fifth method step
37. Sixth method step
38. Seventh method step
39. Eighth method step

The invention claimed is:

1. A method for operating a valve, said method comprising the steps of
    locating an operating key system at said valve,
    communicating a location of said operating key system wirelessly to a central data system from said operating key system,
    communicating a rotational direction to open or close said valve wirelessly from said central data system to said operating key system based on said location,
    engaging an operating device of said valve by way of an operating key of said operating key system,
    rotating said operating key manually towards an open or a closed position of said valve while engaging said operating device based on said received rotational direction to open or close said valve,
    detecting the direction in which said operating key is rotated, wherein said direction of rotation is detected by way of a rotation direction detector of said operating key,
    detecting if said valve has reached said open or closed position, wherein said open or closed position is detected by way of an end position detector of said operating key, and
    communicating said location, said direction of rotation and said open or closed position wirelessly to the central data system from said operating key system.

2. The method according to claim 1, wherein detecting if said valve has reached said open or closed position includes detecting a torque applied by said operating key on said operating device while rotating said operating key.

3. The method according to claim 1, wherein detecting if said valve has reached said open or closed position includes detecting a rotational angle of said operating key.

4. The method according to any claim 1, wherein said method comprises communicating said location, said direction of rotation and said open or closed position wirelessly to said central data system via a control unit of said operating key system.

5. The method according to claim 1, wherein said operating key system is located at said valve manually by an operator of said operating key system.

6. The method according to claim 1, wherein communication of said location of said operating key system wirelessly to said central data system is initiated by an operator of said operating key system.

7. The method according to claim 1, wherein said method further comprises the step of storing said location, said direction of rotation and said open or closed position at said central data system.

8. The method according to claim 1, wherein said method further comprises detecting if said operating key is engaging said operating device correctly by way of an engagement detector of said operating key.

9. The method according claim 1, wherein said method further comprises the step of obtaining said location of said operating key system by way of a GPS unit of said operating key system.

10. The method according to claim 1, wherein said operating key is rotated manually by an operator engaging a handhold of said operating key.

11. The method according to claim 1, wherein said method comprises detecting an identifier of said valve by way of an identification detector of said operating key system.

12. The method according to claim 1, wherein identification data of said valve is also communicated wirelessly from said central data system to said operating key system based on said location.

13. The method according to claim 1, wherein maximum end position torque data of said valve is also communicated wirelessly from said central data system to said operating key system based on said location.

14. The method according to claim 1, wherein said valve is buried beneath ground surface.

15. The method according to claim 1, wherein said operating key system comprises a control unit including a user interface.

16. The method according to claim 15, wherein said method comprises communicating said location, said direction of rotation and said open or closed position wirelessly to said central data system by way of said control unit.

17. The method according to claim 15, wherein said method comprises communicating said location, said direction of rotation and said open or closed position wirelessly from said operating key to said control unit and wirelessly from said control unit to said central data system.

18. The method according to claim 15, wherein said rotational direction to open or close said valve is communicated wirelessly from said central data system to said control unit and displayed by way of said user interface.

19. The method according to claim 15, wherein said operating key and said control unit are formed as two physically separate parts.

20. The method according to claim 15, wherein said control unit is a mobile phone, a tablet, or a laptop.

* * * * *